United States Patent [19]

Weissel

[11] 4,161,492
[45] Jul. 17, 1979

[54] CYCLOALIPHATIC AMINES AND PROCESS FOR PREPARING SAME

[75] Inventor: Oskar Weissel, Krefeld, Fed. Rep. of Germany

[73] Assignee: Bayer Aktiengesellschaft, Leverkusen, Fed. Rep. of Germany

[21] Appl. No.: 819,537

[22] Filed: Jul. 27, 1977

Related U.S. Application Data

[62] Division of Ser. No. 646,826, Jan. 6, 1976, abandoned.

[30] Foreign Application Priority Data

Jan. 24, 1975 [DE] Fed. Rep. of Germany ....... 2502893

[51] Int. Cl.² ............................................. C07C 85/00
[52] U.S. Cl. .............................. 260/563 R; 252/458; 252/461; 252/470; 260/351; 260/563 B; 260/563 D; 260/570 D; 260/570.5 A; 528/68; 528/344; 528/347; 528/353; 528/363
[58] Field of Search ............ 260/563 B, 563 R, 563 D, 260/570 D

[56] References Cited

U.S. PATENT DOCUMENTS

| | | | |
|---|---|---|---|
| 2,511,028 | 6/1950 | Whitman | 260/570.5 X |
| 2,606,924 | 8/1952 | Whitman | 260/563 |
| 2,606,928 | 8/1952 | Barkdoll et al. | 260/563 |
| 3,743,677 | 7/1973 | Grosskindsky et al. | 260/563 |

Primary Examiner—Robert V. Hines
Attorney, Agent, or Firm—Sprung, Felfe, Horn, Lynch & Kramer

[57] ABSTRACT

Cycloaliphatic amines are prepared by catalytically hydrogenating an aromatic amine under elevated pressures and temperatures in the presence of a supported ruthenium catalyst wherein the support is a hydroxide and/or hydrated oxide of chromium and manganese and/or their dehydration products. The catalyst preferably contains from 0.1 to 10% by weight ruthenium based on the total weight of the supported catalyst. Novel cycloaliphatic amines produced according to the process have the formulas

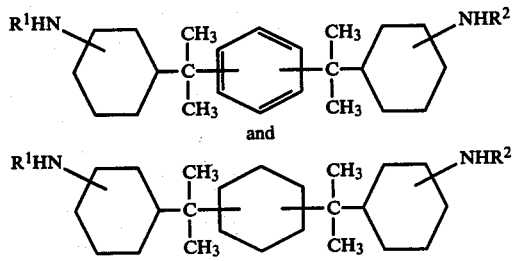

and wherein
the R substituents are hydrogen or alkyl.

17 Claims, No Drawings

CYCLOALIPHATIC AMINES AND PROCESS FOR PREPARING SAME

This is a division, of application Ser. No. 646,826, filed Jan. 6, 1976, now abandoned.

BACKGROUND

This invention relates to a process for the preparation of cycloaliphatic amines by the cytalytic hydrogenation of the corresponding aromatic amines in the presence of a supported ruthenium catalyst, and a new cycloaliphatic amines.

The use of a ruthenium catalyst for the nuclear hydrogenation of 4,4'-diamino-diphenyl-methane is already known from German Published Specifications Nos. 1,542,392 and 1,909,342. In this known process, however, large amounts of catalyst, relative to the starting material employed, are required, and the activity and selectivity of the catalyst are limited. There is therefore a need for a better and generally applicable process for the preparation of cycloaliphatic amines by catalytic hydrogenation of the corresponding aromatic amines.

SUMMARY

It has now been found that cycloaliphatic amines are obtained in good yield by catalytic hydrogenation of the corresponding aromatic amines at elevated pressure and elevated temperature in the presence of a ruthenium catalyst, if a supported ruthenium catalyst is used, of which the catalyst support consists of hydroxides and/or hydrated oxides of chromium and manganese and/or their dehydration products.

The ruthenium content of the catalyst according to the invention, calculated as ruthenium, is in general 0.1 to 10% by weight, preferably 0.5 to 5% by weight, relative to the supported catalyst.

DESCRIPTION

In general, the weight ratio of the elements manganese and chromium to one another is in general 0.2:1 to 5:1, preferably 0.5:1 to 3:1, especially 0.8:1 to 2:1.

The preparation of the catalyst according to the invention can be carried out according to methods which are in themselves known. It is suitably carried out in two stages, with the catalyst support being prepared in the first stage and the ruthenium being applied to the catalyst support in the second stage.

The preparation of the catalyst support can be carried out according to methods which are in themselves known, for example by co-precipitation of a chromium hydroxide and manganese hydroxide mixture from a solution containing chromium salts and manganese salts by means of alkali metal hydroxide solution or ammonia, with subsequent elution of the soluble constituents with water (Journal American Chemical Society, volume 63, pages 1385 and 1386 (1941)). It can also be carried out by precipitating manganese carbonate from a manganese salt solution by means of alkali metal carbonate or ammonium carbonate, washing it with water until it is free from anions and then reacting it, in aqueous suspension, with ammonium bichromate at an elevated temperature, preferably 70° to 100° C. (compare German Published Specification No. 1,443,901). A further possibility is the preparation according to German Published Specification No. 1,542,370 by reaction of manganese carbonate with chromium trioxide.

The catalyst support according to the invention can also be mixed with other known catalyst supports, such as $Al_2O_3$, $SiO_2$, kieselguhr, pumice or iron oxide, in a known manner, for example by adding these carrier materials to the manganese salt solution before precipitating the manganese carbonate. Equally, it is also possible to add, instead of these support materials, their water-soluble precursors, such as iron salts and aluminium salts. In general, the proportion of this support material will not exceed 50% by weight. The appropriate amount to be chosen can be determined easily by a few experiments.

The catalyst support according to the invention can be employed in the second stage either directly after its preparation, in a form in which it is moist with water, or after drying at an elevated temperature, of up to about 120° C., and, optionally, after a further heat treatment.

For this purpose, the drying can be carried out either under normal pressure or under reduced pressure, and in the latter case a lower drying temperature can be chosen.

The further heat treatment is suitably carried out at temperatures above 200° and up to about 450° C., preferably in the temperature range from 250° to 350° C. This heat treatment can in particular be advantageous in the case of catalyst supports which are prepared using chromium-(VI) compounds.

After the drying or the further heat treatment, the catalyst support according to the invention can additionally be ground, homogenised and moulded into shapes, in a manner which is in itself known.

The second stage of the preparation of the catalyst, namely the application of the ruthenium to the catalyst support, can also be carried out according to methods which are in themselves known; in these, appropriate starting materials are water-soluble ruthenium compounds, such as ruthenium trichloride hydrate.

To prepare pulverulent catalysts it can be of advantage to carry out the deposition of the ruthenium on the catalyst support from aqueous solution, for example by precipitation with alkali metal hydroxide solutions or alkali metal carbonate solutions.

One way for preparing particulate catalysts is, for example, to impregnate the catalyst support, after it has been moulded, for example by tableting the pulverulent support, successively with the ruthenium salt solution and with the precipitation solution described above, in optional sequence, carry out an intermediate drying in each case after impregnation, and then elute with water the alkali metal salt which has been produced. It is however also possible to spray the two solutions in succession onto the moulded catalyst support in a heated dragée-coating drum and then to wash the support. Whether the impregnation or dragée-coating is carried out once or several times depends on the amount of ruthenium to be applied.

The catalyst according to the invention can be used directly after drying. However, it can also be advantageous to subject it to a treatment with hydrogen, at temperatures of about 20° to about 200° C., before it is used.

Suitable starting compounds for the process according to the invention are aniline and substituted anilines.

Accordingly, the process according to the invention can serve for the catalytic nuclear hydrogenation of aromatic amines of the formula

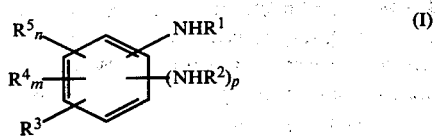 (I)

in which
R$^1$, R$^2$ and R$^3$ are identical or different and represent hydrogen or an alkyl radical,
R$^4$ and R$^5$ are identical or different and represent an optionally substituted alkyl, cycloalkyl, aralkyl or aryl radical and
m, n and p each represent one of the numbers 0 or 1.

As alkyl radicals, there may be mentioned straight-chain and branched alkyl radicals with 1 to 10 C atoms, preferably with up to 6, and especially with up to 4, C atoms, for example methyl, ethyl, propyl, isopropyl, butyl, isobutyl, tert. butyl and the isomeric pentyl and hexyl radicals.

As cycloalkyl radicals there may be mentioned optionally substituted cycloalkyl radicals with up to 10 C atoms, preferably cyclopentyl and cyclohexyl.

As aralkyl radicals there may be mentioned those with up to 30 C atoms, preferably with up to 6 C atoms, in the alkyl part and 12 C atoms in the aromatic part, for example benzyl, benzhydryl, phenylethyl, phenylpropyl, phenylisopropyl, phenylbutyl, phenylisobutyl and phenyltrimethylpropyl, preferably benzyl and phenylisopropyl.

As aromatic radicals, there may be mentioned those with up to 14 C atoms, preferably phenyl and naphthyl, especially phenyl.

As examples of substituents of the optionally substituted radicals R$^4$ and R$^5$ there may be mentioned lower alkyl radicals, the hydroxyl group and, preferably, the amino group and the lower alkylamino group.

A particular group of the compounds of the general formula I accordingly corresponds to the formula II

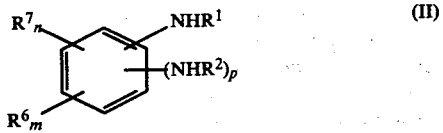 (II)

in which
R$^1$, R$^2$, m, n and p have the above-mentioned meaning and
R$^6$ and R$^7$ are identical or different and represent an alkyl radical.

The following may be mentioned as examples of compounds of the general formula II: aniline, alkylanilines such as o-, m- and p-toluidine, xylidines such as 1,2,3-, 1,2,4- and 1,3,4- and 1,3,5-xylidine, ethylaniline, propylaniline, isopropylaniline, butylaniline, isobutylaniline, tert. butylaniline and anilines substituted by higher alkyl radicals, and also N-alkylanilines, such as N-methylaniline, N-ethylaniline, N-propylaniline, N-isopropylaniline and the isomeric N-butylanilines, N-pentylanilines and N-hexylanilines, o-, m- and p-phenylenediamine and 2,4-diaminotoluene.

Further examples of compounds of the general formula I which may be mentioned are: 4,4'-diaminodiphenyl, bis-(4-aminophenyl)-methane, bis(4-methylaminophenyl)-methane, 3,3',5,5'-tetramethyl-4,4'-diaminodiphenyl-methane, 3,3',5,5'-tetraethyl-4,4'-diaminodiphenyl-methane, 2,2-bis-(4-aminophenyl)-propane, 1,1-bis-(4-aminophenyl)-cyclohexane, 4,4',4''-triaminotriphenyl-methane and 1,3-bis-(4-aminophenyl)-1,1,3-trimethyl-propane.

Particular groups of substituted anilines of the formula I correspond to the general formulae

 (III)

and

 (IV)

in which
R$^1$, R$^2$ and R$^3$ have the above-mentioned meaning,
R$^8$, R$^9$ and R$^{10}$ are identical or different and represent hydrogen or an alkyl radical and
A represents an optionally substituted alkylene radical, preferably with 1–6 carbon atoms.

A further preferred group of starting compounds corresponds to the general formula

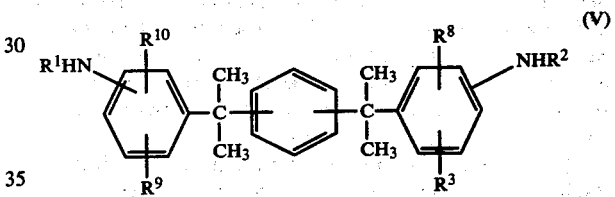 (V)

in which
R$^1$, R$^2$, R$^3$, R$^8$, R$^9$ and R$^{10}$ have the above-mentioned meaning.

As compounds of the formula V there may be mentioned preferentially α,α'-bis-(4-aminophenyl)-m-diisopropylbenzene, α,α'-bis-(4-aminophenyl)-p-diisopropylbenzene, α,α'-bis-(4-methylaminophenyl)-p-diisopropylbenzene, α,α'-bis-(4-methylaminophenyl)-m-diisopropylbenzene and mixtures of the above-mentioned isomeric compounds.

In general, the process according to the invention is carried out at an elevated temperature, above 150° C. and up to about 350° C., preferably in the temperature range between about 180° and 280° C. Equally, the process according to the invention is carried out at elevated pressure, in general at a pressure above 100 bars, in particular above 180 bars and up to about 1,000 bars. In general, the rate of reaction increases with higher pressure so that only the nature of the apparatus imposes an upper limit on the pressure.

In general, the process according to the invention is carried out without using a solvent; however, the presence of a solvent is not harmful, though in general it produces no advantage.

In general, the catalyst used according to the invention is employed in an amount of which the ruthenium content is about 0.005 to 0.5 g, preferably about 0.01 to 0.2 g and especially 0.02 to 0.1 g per kg of the starting material to be hydrogenated.

In general, the process according to the invention can be carried out discontinuously or continuously, in the customary manner, for example in a stirred autoclave or a reaction tube; the apparatuses required for carrying out the process according to the invention form part of the state of the art. For example, it is possible to carry out the process according to the invention as a sump phase process or as a trickle phase process.

When carried out discontinuously, the process according to the invention is carried out in the usual manner as a sump phase process in an autoclave in the presence of pulverulent catalyst.

It is particularly advantageous to carry out the process according to the invention continuously. This is done in the usual manner, either with pulverulent catalyst, for example in accordance with the bubble column principle, by passing the liquid starting material, in which the catalyst is suspended, together with hydrogen in co-current through a reaction tube cascade, or with particulate catalyst, for example in accordance with the trickle phase principle, by trickling the liquid starting material over the stationary catalyst located in the reaction tube, whilst the hydrogen is passed in co-current or counter-current through the reaction tube. Advantageously, excess hydrogen is recycled in these processes.

In th case of polynuclear aromatic amines it is possible so to direct the reaction that either all or only some of the aromatic nuclei are hydrogenated. For example, α,α-bis-(4-aminocyclohexyl)-p-diisopropylbenzene is obtained in almost quantitative yield when α,α-bis-(4-aminophenyl)-p-diisopropylbenzene is carried out at 250° C. and a hydrogen pressure of about 200 to 300 bars in the presence of one percent by weight of the catalyst according to the invention, having a ruthenium content of 1% by weight, until the stoichiometrically required amount of hydrogen, of 6 mols per mol of starting compound, has been taken up.

If the hydrogenation is continued under the stated conditions until 9 mols of hydrogen have been taken up per mol of starting compound, α,α'-bis-(4-aminocyclohexyl)-1,4-diisopropyl-cyclohexane is obtained. The reactions with 6 and 9 mols of hydrogen can be deputed as follows:

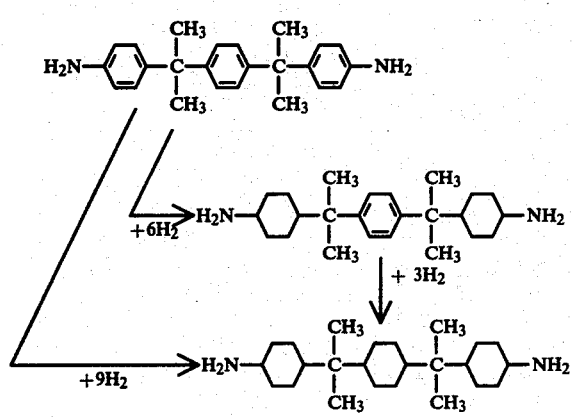

The rate of the hydrogenation reaction of the middle nucleus is, under identical conditions, substantially lower than that of the outer nuclei, so that a pronounced kink is found in the reaction rate/time diagram. For hydrogenation of the middle nucleus it is therefore advisable to select higher temperatures, higher hydrogen pressures and lower throughputs per unit amount of catalyst.

In general it is thus possible to obtain from compounds of the formula V, by the process according to the invention, preferentially compounds of the formulae

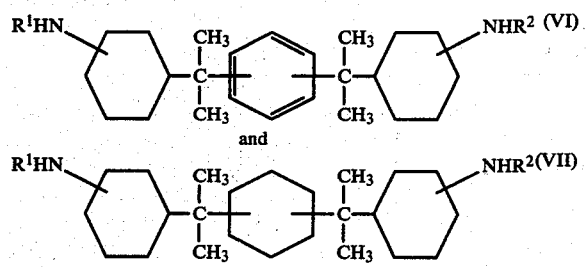

in which
R$^1$ and R$^2$ have the above-mentioned meanings. The most appropriate reaction conditions, for example with respect to temperature, hydrogen pressure, catalyst concentration and throughput per unit amount of catalyst can easily be determined, in each individual case, by some preliminary experiments.

Compounds of the formula VI and VII are new. They are valuable intermediate products for the preparation of polycondensation plastics and lacquers, such as polyureas, polyimides and above all polyamides and polyurethanes. Thus, for example, the polyamides prepared for primary diamines of formulas VI and VII are distinguished by improved hardness and elasticity (E-modulus), transparency, high glass transition temperature, low water absorption, improved solubility in customary solvents and improved electrical properties, that is to say a low dielectric loss factor (tg δ) and high tracking resistance. Comparable improved properties are also exhibited by the polyurethanes prepared from primary and secondary diamines of formulas VI and VII. They are particularly suitable for use in the lacquer field because of their light colour and high resistance to yellowing. Furthermore, their resistance to degradation by exposure to aggressive chemicals should be singled out.

The particular advantages of the process according to the invention over hydrogenation processes are that the process can be carried out in the absence of an inert solvent and of ammonia, the presence of both of which has hitherto been advantageous in order to avoid side-reactions (German Published Specification No. 1,909,342). Furthermore, it is possible to use a substantially smaller amount of ruthenium, relative to the starting material in the process according to the invention, that that which corresponds to the state of the art (German Published Specification No. 2,132,547). Furthermore, the process according to the invention can be carried out at a higher temperature than that which corresponds to the state of the art. By avoiding dilution by an inert solvent or ammonia, using a higher temperature and hence a higher reaction rate, the process according to the invention gives a substantially higher space-time yield and uses less ruthenium.

EXAMPLE 1

A solution of 2,500 g of sodium carbonate in 10 l of water is added over the course of about 10 minutes, while stirring, to a solution of 3,000 g of MnSO$_4$H$_2$O in 15 l of water. The precipitate which has separated out is washed until free from sulphate, suspended in 10 l of water and heated to 85° C., whilst stirring. A solution of 5,350 g of ammonium bichromate in 7,000 ml of water is allowed to run into this suspension at 85° C. and the mixture is stirred for a further 3 hours at 85° C. After cooling, the dark precipitate is filtered off, rinsed with a little water and dried at 120° C. 3,510 g of a brown-black powder (support (1)) are obtained.

Analysis: 27.3% of Mn; 25.3% of Cr.

100 g of the homogenised support (1) are suspended in 500 ml of water and a solution of 2.48 g of ruthenium chloride hydrate (Ru content: 40.3%) in 200 ml of 0.05 N HCl is added at room temperature, whilst stirring. Thereafter, about 140 ml of N sodium hydroxide solution are added dropwise over the course of about 5 minutes until the pH value is 9–10. After stirring for a further five hours, the catalyst is separated off, washed until free from chloride and dried for 3 hours at 110° C. 93 g of a brown-black powder (catalyst (1)) are obtained.

Analysis: 28.7% of Mn; 20.6% of Cr; 1.1% of Ru.

EXAMPLE 2

300 g of support (1) are heated to 250°–260° C. to about 30 minutes. 246 g of a brown-black powder (support (2)) are obtained.

Analysis: 33.2% of Mn; 30.8% of Cr.

50 g of the homogenised support (2) are suspended in 250 ml of water and a solution of 1.24 g of ruthenium trichloride hydrate in 100 ml of 0.05 N HCl, and 85 ml of N NaOH, are added successively, as described above. After stirring for a further five hours, the product is filtered off, washed until free from chloride and dried in a vacuum desiccator. 50.5 g of a black-brown powder (catalyst (2)) are obtained.

Analysis: 32.9% of Mn; 23.8% of Cr; 1.0% of Ru.

EXAMPLE 3

A solution of 281 g of $Na_2CO_3$ in 1,200 ml of water is added over the course of 5 minutes, whilst stirring, to a solution of 338 g of $MnSO_4.H_2O$ and 50 g of $Al(NO_3)_3.9H_2O$ in 1,600 ml of water. The precipitate is washed until free from sulphate and nitrate and is warmed, as a suspension in 1,000 ml of water, to 85° C. A solution of 550 g of $(NH_4)_2Cr_2O_7$ in 750 ml of water is then added over the course of 5 minutes and the mixture is stirred for a further 90 minutes at 85° C. After cooling, the dark precipitate is filtered off, washed with about 1,000 ml of water and dried for 12 hours at 120° C. 353 g of a brown-black powder (support (3a)) are obtained.

Analysis: 25.0% of Mn; 19.2% of Cr; 1.8% of Al.

100.0 g of the support (3a) are heated to 250° C. for about 30 minutes. 78.0 g of a brown-black powder (support (3b)) are obtained.

Analysis: 32.0% of Mn; 23.7% of Cr; 2.3% of Al.

10.0 g of the homogenised support (3b) are suspended in 50 ml of water and a solution of 0.248 g of ruthenium trichloride hydrate (Ru content: 40.3%) in 20 ml of 0.05 N HCl is added at room temperature whilst stirring. About 15 ml of N NaOH are then added dropwise over the course of 5 minutes, until the pH value has assumed a value of about 9–10. After stirring for a further five hours, the catalyst is separated off, washed until free from chloride and dried in a vacuum desiccator. 10.0 g of a brown-black powder (catalyst (3)) are obtained.

EXAMPLE 4

A solution of 530 g of ammonium carbonate in 1,200 ml of water is added over the course of 10 minutes to a solution of 338 g of $MnSO_4.H_2O$ and 500 g of $Al(NO_3)_3.9H_2O$ in 1,800 ml of water at room temperature, whilst stirring. The mixture is stirred for about 30 minutes longer and the precipitate is washed until free from sulphate and nitrate and is then reacted, in aqueous suspension in 1,000 ml of water, with a solution of 530 g of ammonium bichromate in 750 ml of water by heating for 2.5 hours to 85° C. After cooling, the dark-coloured precipitate is separated off, rinsed with about 500 ml of water and dried for 3 hours at 120° C. 455 g of a brown-black mass are obtained (analysis: 22.8% of Mn, 21.0% of Cr and 9.3% of Al); this is heated to 250° C. for 20 minutes, giving 390 g of a brown-black powder (support (4)).

Analysis: 26.6% of Mn; 24.5% of Cr; 10.8% of Al.

10.0 g of the support (4) are suspended in 50 ml of water and a solution of 0.248 g of ruthenium trichloride hydrate in 20 ml of 0.05 N HCl is added at room temperature, followed by about 14 ml of N NaOH, added over the course of 10 minutes, until the pH value is 9–10. After stirring for a further five hours, the catalyst is separated off, washed until free from chloride and dried in a vacuum desiccator. 9.8 g of a brown-black powder (catalyst (4)) are obtained.

EXAMPLE 5

A solution of 590 g of ammonium carbonate in 1,350 ml of water is allowed to run, over the course of 5 minutes, into a solution of 338 g of $MnSO_4.H_2O$, 500 g of $Al(NO_3)_3.9H_2O$ and 70 g of $FeSO_4.7H_2O$ in 2,000 ml of water at 25° C., whilst stirring. The mixture is stirred for about 30 minutes longer, the precipitate is washed until free from sulphate and nitrate and is subsequently heated, in suspension in 1,000 ml of water, to 85° C., and at this temperature a solution of 550 g of $(NH_4)_2Cr_2O_7$ in 750 ml of water is allowed to run in. The mixture is stirred for about 2 hours longer at 85° C., and after cooling the dark precipitate is separated off, rinsed with 500 ml of water and dried for 3 hours at 120° C. 480 g of a brown-black powder are obtained. Analysis: 21.7% of Mn, 20.0% of Cr, 8.9% of Al and 2.5% of Fe. This powder is heated to 250° C. for about 30 minutes. 392 g of a brown-black powder (support (5)) are thus obtained.

10.0 g of the pulverulent support (5) are suspended in 50 ml of water and a solution of 0.248 g of ruthenium trichloride hydrate (ruthenium content: 40.3% by weight) in 20 ml of 0.05 N HCl is added. About 17 ml of N NaOH are then added dropwise until the pH value is about 8–10. After 5 hours, the dark precipitate is separated off, washed until free from chloride and dried for 2 hours at 120° C. 9.6 g of a brown-black powder (catalyst (5)) are obtained.

EXAMPLE 6

(Comparison Example)

10.0 g of finely powdered $Cr_2O_3$, $MnO_2$ or $MnCO_3$ are suspended in 50 ml of water and treated, analogously to Examples (3) to (5), in each case first with a solution of 0.248 g of $RuCl_3$.hydrate in 20 ml of 0.05 N HCl and subsequently with N NaOH until the pH value is 9–10. After washing and drying, the following are obtained:

Catalyst (6a): Ru (1%)/Cr$_2$O$_3$; 10.1 g;
Catalyst (6b): Ru (1%)/MnO$_2$; 9.7 g;
Catalyst (6c): Ru (1%)/MnCO$_3$; 10.0 g.

EXAMPLES 7 TO 12 (USE)

100 g of 4,4'-diamino-diphenyl-methane are hydrogenated in a shaking autoclave at 250° C., in the pressure range of 200 to 280 bars, using one of the catalysts listed in Table I below, until the absorption of hydrogen has ceased. The amount of ruthenium used is in each case 0.05 g per kg of substance to be hydrogenated. The results in Table I are obtained.

EXAMPLE 13

(Comparison Example)

For comparison with the catalyst according to the invention, commercially available catalysts, or catalysts which only contain individual constituents of the catalyst supports according to the invention, are employed under conditions otherwise identical to those mentioned in Examples 7 to 12. The amounts of ruthenium used are here again in every case about 0.05 g per kg of substance to be hydrogenated. The results are shown in Table II.

Table I

| Example No. | Catalyst No. | Catalyst Composition | Amount (g) | Hydrogenation time (mins) | By-products | Yield (%) H$_2$N–C$_6$H$_{10}$–CH$_2$–C$_6$H$_{10}$–NH$_2$ | Distillation residue |
|---|---|---|---|---|---|---|---|
| 7  | (1) | Ru(1%)—Mn—Cr        | 0.5 | 80  | 0.8 | 97.4 | 1.8 |
| 8  | (2) | Ru(1%)—Mn—Cr        | 0.5 | 70  | 0.7 | 98.5 | 0.8 |
| 9  | (2) | Ru(1%)—Mn—Cr (1)    | 0.5 | 100 | 1.0 | 98.2 | 0.8 |
| 10 | (3) | Ru(1%)—Mn—Cr—Al     | 0.5 | 90  | 1.0 | 98.2 | 0.8 |
| 11 | (4) | Ru(1%)—Mn—Cr—Al     | 0.5 | 70  | 0.8 | 97.7 | 1.5 |
| 12 | (5) | Ru(1%)—Mn—Cr—Al—Fe  | 0.5 | 100 | 0.7 | 97.3 | 2.0 |

(1) This catalyst was treated with hydrogen at 100° C. for 1 hour prior to use.

Table II

| No. | Catalyst Composition | Amount (g) | Hydrogenation time (mins) | Notes | By-products | Yield (%) bis(4-aminocyclohexyl)methane | Yield (%) (4-aminocyclohexyl)(4-aminophenyl)methane | Yield (%) bis(4-aminophenyl)methane | Distillation residue |
|---|---|---|---|---|---|---|---|---|---|
| | Ru(5%)—Al₂O₃ (commercially available) | 0.1 | 925 | Hydrogenation remains incomplete | 2.2 | 33.2 | 37.8 | 0.4 | 22.7 |
| (6a) | Ru(1%)—Cr₂O₃ | 0.5 | 185 | " | 1.2 | 2.3 | 33.6 | 54.9 | 8.0 |
| (6b) | (Ru(1%)—MnO₂) | 0.5 | 890 | Temperature 250°–270° C. | 1.7 | 74.1 | 7.6 | — | 16.0 |
| (6c) | Ru(1%)—MnO₃ | 0.5 | 465 | Hydrogenation does not go to completion | 1.1 | 5.1 | 46.6 | 36.2 | 11.0 |

The example shows that the comparison catalysts only show an unsatisfactory activity and selectivity at the low use concentrations at which the catalysts according to the invention still show a high activity. The hydrogenations cannot be taken quantitatively to completion.

EXAMPLE 14

2,000 g of 4,4'-diamino-diphenyl-methane are stirred with 4.0 g of the catalyst (3) at 250° C. under a hydrogen pressure of 280 bars in a stirred autoclave until the absorption of hydrogen has ceased; duration about 150 minutes. After cooling, the reaction product is taken up in methanol and the mixture is filtered and distilled. 2,100 g of distillate, boiling point 128°-130° C./0.05 mm Hg are obtained, consisting of 99.2% of 4,4'-diaminodicyclohexylmethane and 0.8% of 4-aminodicyclohexylmethane, corresponding to a yield of 98% of theory. The solidification point of the distillate is 42° C.

EXAMPLE 15

1,500 g of 2,4-diaminotoluene are stirred in the presence of 7.5 g of catalyst (3) having a ruthenium content of about 1% by weight, under a hydrogen pressure of about 280 bars and in the temperature range of 235° to 250° C., until the absorption of hydrogen has ceased; duration: 9 hours. After cooling, the catalyst is separated off by filtration and the filtrate is subjected to fractional distillation. 23 g of hexahydrotoluidine, 1,525 g of 2,4-diamino-methylcyclohexane (=96.8% of theory) and 21 g of distillation residue are obtained.

COMPARISON EXPERIMENT

If the hydrogenation is carried out under the same conditions in the presence of 1.5 g of a commercially available Ru(5%)/Al$_2$O$_3$ catalyst, the hydrogenation stops after a hydrogen absorption of about 25% of theory, within 5.5 hours. If a further 6.0 g of the Ru(5%)/Al$_2$O$_3$ catalyst are added to the hydrogenation batch, a reaction mixture which consists to the extent of 49.1% of hexahydrotoluidine and to the extent of 46.7% of 2,4-diamino-methylcyclohexane is obtained after a further 6.5 hours.

EXAMPLE 16

100 g of 4,4'-diamino-3,3',5,5'-tetraethyl-diphenylmethane are shaken, in the presence of 0.5 g of the catalyst (1), in a shaking autoclave at 250° C. under a hydrogen pressure of 200-280 bars until the absorption of hydrogen has ceased; hydrogenation time: 5 hours. The hydrogenation product is worked up by distillation in the usual manner, after separating off the catalyst. 102 g of a colourless, viscous distillate, boiling point$_{0.2}$: 157°-163° C., are obtained, consisting of practically pure 4,4'-diamino-3,3',5,5'-tetraethyl-dicyclohexylmethane. Yield: 98% of theory. The titration gives 9.9% of strongly basic primary amino groups. The analysis by gas chromatography indicates a degree of purity of 100%.

EXAMPLES 17 AND 18

Equally good results are obtained on hydrogenating the following bis-aniline derivatives using the same procedure as in Example 16. The results are summarised in Table III:

Table III

| Example No. | Starting material | Catalyst | g | Hydrogenation conditions | | | Result | |
|---|---|---|---|---|---|---|---|---|
| | | | | Temperature (°C.) | Hydrogen pressure (bars) | Time (hrs) | Yield of diamine (% of theory) | (°C.) |
| 17 | 1,1-Bis-(4-aminophenyl)-cyclohexane | (2) | 1.0 | 250-270 | 200-280 | 4 | 92 | Boiling point$_{0.1}$: 152-155 Solidification point: 55-71 |
| 18 | 2,2-Bis-(4-aminophenyl)-propane | (2) | 1.0 | 250 | 200-280 | 3 | 95 | Boiling point$_{0.3}$: 133-136 |

EXAMPLE 19

100 g of N,N'-dimethyl-4,4'-diaminophenylmethane are hydrogenated in the presence of 0.5 g of the catalyst (1) under a hydrogen pressure of 180-280 bars until the absorption of hydrogen has ceased. The hydrogenation temperature is raised from 165° C. to 210° C. over the course of the 3 hours' hydrogenation. On working up, by distillation, the hydrogenation product which has been freed from the catalyst, N,N'-dimethyl-4,4'-diaminodicyclohexylmethane is obtained as a colourless viscous liquid, boiling point: 120°-122° C./0.1 mm Hg. amount: 104.5 g=99% of theory.

Analysis: total strongly basic nitrogen, found 11.7%; secondary strongly basic nitrogen, found 11.6%; calculated 11.73%.

EXAMPLE 20

100 g of α,α'-bis-(4-aminophenyl)-p-diisopropylbenzene are hydrogenated in the presence of 1.0 g of the catalyst (3) (about 1% of ruthenium) at 240°-250° C. under a hydrogen pressure of 170-290 bars until the rate of hydrogen absorption decreases very greatly. Hydrogenation time about 100 minutes. After cooling, the reaction product is taken up in methanol, the solution is filtered and after driving off the solvent, the residue is distilled in vacuo.

101 g of α,α'-bis-(4-aminocyclohexyl)-p-diisopropylbenzene, corresponding to 97.6% of theory, are obtained. Boiling point: 203°-205° C./0.1 mm Hg; solidification point: 97°-105° C.

Analysis: strongly basic nitrogen: found 7.75%; calculated 7.85%.

COMPARISON EXPERIMENT

If the hydrogenation is carried out in the presence of 0.2 g of a commercially available Ru(5%)/Al$_2$O$_3$ catalyst, a hydrogenation product is obtained, after a hydrogenation time of 590 minutes, from which, on working up by distillation, 59 g of 95.5% pure α,α'-bis-(4-aminocyclohexyl)-p-diisopropylbenzene are isolated (=54.4% of theory), whilst 42 g of distillation residue arise.

EXAMPLE 21

100 g of α,α'-bis-(4-methylamino-phenyl)-p-diisopropylbenzene are hydrogenated in the presence of 1.0 g of the catalyst (2) (about 1% of ruthenium) at 180°–200° C. and 200–280 bars hydrogen pressure, until the absorption of hydrogen has ceased. Duration about 160 minutes. After cooling, the hydrogenation product is taken up in methanol, the solution is filtered and concentrated and the residue is distilled under reduced pressure. 103 g of α,α'-bis-(4-methylaminocyclohexyl)-p-diisopropylbenzene are obtained, corresponding to 100% of theory. Boiling range: 203°–206° C./0.2 mm Hg, solidification point: 84°–86° C.

Analysis: total strongly basic nitrogen, found 7.22%; secondary strongly basic nitrogen, found 7.19%; calculated 7.28%.

COMPARISON EXPERIMENT

If instead of 1.0 g of the catalyst (2), 0.2 g of a commercially available Ru(5%)/Al$_2$O$_3$ catalyst is used, 98.5 g of hydrogenation product are obtained after 6 hours' hydrogenation at 210° C.; boiling range: 205°–210° C./0.2 mm Hg, solidification point: 107°–108° C.

Analysis: total strongly basic nitrogen: found 7.07%; aromatically bonded nitrogen: found 0.20%; secondary strongly basic nitrogen: found 6.60%; calculated 7.28%.

The comparison experiment shows that the hydrogenation using the Ru(5%)/Al$_2$O$_3$ catalyst is associated with a considerable degree of elimination of the methyl group. Furthermore, the hydrogenation does not take place quantitatively, as is shown by the proportion of aromatically bonded nitrogen.

EXAMPLE 22

100 g of 4,4'-triamino-triphenyl-methane in the presence of 2.0 g of the catalyst (2) are shaken at 260° to 265° C. under a hydrogen pressure of 240 to 300 bars until the absorption of hydrogen has ceased; duration about 19 hours. After cooling, the reaction mixture is taken up in methanol and the solution is filtered and distilled after concentration under the pressure employed. 60.5 g of a colourless, viscous distillate, which crystallises slowly, are obtained; boiling range: 188°–193° C./0.2 mm Hg.

Analysis: basic nitrogen: found 13.0%; calculated 13.66%.

Recrystallisation from a three-fold amount of methylcyclohexane gives colourless crystals; melting point: 132°–136° C.

Analysis: strongly basic nitrogen: found 13.5%; calculated 13.66%.

EXAMPLE 23

If the hydrogenation of Example 22 is carried out in the presence of 4.0 g of the same catalyst at 250° C. under a hydrogen pressure of 250 to 300 bars, 82.0 g of colourless distillate, which crystallises slowly, are obtained after 7 hours' reaction time and subsequent distillation; boiling range: 145°–200° C./0.3 mm Hg. p Analysis: strongly basic nitrogen: found 13.2%; calculated 13.66%.

What is claimed is:

1. Process for preparing a cycloaliphatic amine which comprises catalytically hydrogenating an aromatic amine under elevated pressures and temperatures in the presence of a supported ruthenium catalyst wherein the support comprises hydroxides and/or hydrated oxides of chromium and manganese and/or their dehydration products.

2. Process of claim 1 wherein the catalyst contains from 0.1 to 10% by weight of ruthenium, relative to the supported catalyst.

3. Process of claim 1 wherein the weight ratio of the elements manganese and chromium, to one another, is from 0.2:1 to 5:1.

4. Process of claim 1 wherein the catalyst contains a further support material.

5. Process of claim 1 wherein the aromatic amine is aniline or a substituted aniline.

6. Process of claim 1 wherein the aromatic amine has the formula

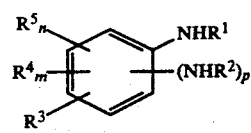

wherein
R$^1$, R$^2$ and R$^3$ are the same or different and each is hydrogen or alkyl,
R$^4$ and R$^5$ are the same or different and each is optionally substituted alkyl, cycloalkyl, aralkyl or aryl and
m, n and p each is 0 or 1.

7. Process of claim 1 wherein the aromatic amine has the formula

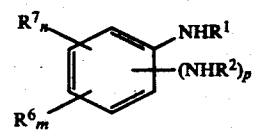

wherein
R$^1$ and R$^2$ are the same or different and each is hydrogen or alkyl,
R$^6$ and R$^7$ are the same or different and each is alkyl and
m, n and p each is 0 or 1.

8. Process of claim 1 wherein the aromatic amine has the formula

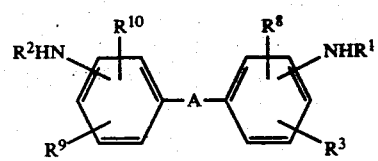

wherein
R$^1$, R$^2$, R$^3$, R$^8$, R$^9$ and R$^{10}$ are the same or different and each is hydrogen or alkyl and
A is optionally substituted alkylene.

9. Process of claim 8 wherein A is optionally substituted alkylene having 1 to 6 carbon atoms.

10. Process of claim 1 wherein the aromatic amine has the formula

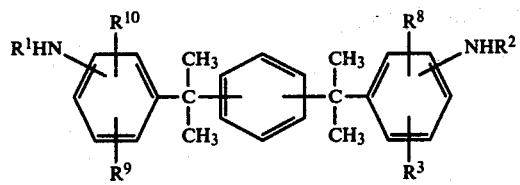

wherein

R¹, R², R³, R⁸, R⁹ and R¹⁰ are the same or different and each is hydrogen or alkyl.

11. Process of claim 1 wherein the hydrogenation is carried out at a temperature of from 150° to 350° C.

12. Process of claim 1 wherein the hydrogenation is carried out at a pressure above 100 bars.

13. A process for preparing a cycloaliphatic amine which comprises catalytically hydrogenating an aromatic amine of the formula

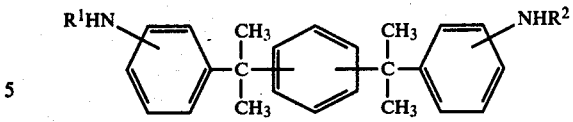

wherein R¹ and R² are the same or different and each is hydrogen or alkyl under elevated pressures and temperatures in the presence of a supported ruthenium catalyst wherein the support comprises hydroxides and/or hydrated oxides of chromium and manganese and/or their dehydration products.

14. Process of claim 13 wherein the catalyst contains from 0.1 to 10% by weight of ruthenium, relative to the supported catalyst.

15. Process of claim 13 wherein the weight ratio of the elements manganese and chromium, to one another, is from 0.2:1 to 5:1.

16. Process of claim 13 wherein the catalyst contains a further support material.

17. Process of claim 13 wherein the hydrogenation is carried out at a temperature of from 150° to 350° C.

* * * * *

UNITED STATES PATENT AND TRADEMARK OFFICE
CERTIFICATE OF CORRECTION

PATENT NO. : 4,161,492
DATED : July 17, 1979
INVENTOR(S) : WEISSEL

It is certified that error appears in the above-identified patent and that said Letters Patent are hereby corrected as shown below:

Column 5, line 25, "th" should read -- the --.

Column 6, line 45, insert -- known -- before "hydrogenation".

Column 6, line 53, "that" first occurrence should read -- than --.

Column 11, No. (6c), second column, "$MnO_3$" should read -- $MnCO_3$ --.

Column 13, line 43, "=96.8%" should eread -- $\triangleq$96.8% --.

Column 15, line 60, delete "p" after -- Hg --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks